United States Patent
Blechen

(10) Patent No.: US 8,442,701 B2
(45) Date of Patent: May 14, 2013

(54) DYNAMIC ROLL ANGLE STALL PROTECTION FOR AN AIRCRAFT

(75) Inventor: Frederick Charles Henry Blechen, Redmond, WA (US)

(73) Assignee: The Boeing Company, Chicago, IL (US)

(*) Notice: Subject to any disclaimer, the term of this patent is extended or adjusted under 35 U.S.C. 154(b) by 1151 days.

(21) Appl. No.: 12/244,257

(22) Filed: Oct. 2, 2008

(65) Prior Publication Data

US 2010/0087970 A1 Apr. 8, 2010

(51) Int. Cl.
*G01C 23/00* (2006.01)
*G05D 1/08* (2006.01)

(52) U.S. Cl.
USPC .............................................. 701/3; 244/181

(58) Field of Classification Search .......... 701/3, 4, 701/5, 6, 7, 8, 10, 15, 16, 18, 24, 25, 26, 701/27, 38; 244/23 A, 23 B, 36, 211, 214, 244/215, 56, 179, 180, 181, 80, 90 R, 90 A, 244/195, 194, 177, 178; 340/963, 967–970, 340/973, 974, 975, 977, 978; 342/38, 63, 342/176, 357.2, 357.33, 357.36, 462; 703/9, 703/11, 12

See application file for complete search history.

(56) References Cited

U.S. PATENT DOCUMENTS

| | | | | |
|---|---|---|---|---|
| 4,924,401 A * | 5/1990 | Bice et al. | .......................... | 701/6 |
| 5,358,199 A * | 10/1994 | Hayes et al. | .................. | 244/1 R |
| 5,571,953 A * | 11/1996 | Wu | .............................. | 73/65.06 |
| 6,246,929 B1 * | 6/2001 | Kaloust | ........................... | 701/11 |
| 6,282,466 B1 * | 8/2001 | Nolte et al. | ..................... | 701/11 |
| 6,793,171 B1 | 9/2004 | Clark | | |

* cited by examiner

*Primary Examiner* — James Trammell
*Assistant Examiner* — Muhammad Shafi
(74) *Attorney, Agent, or Firm* — Yee & Associates, P.C.

(57) ABSTRACT

A method, apparatus, and computer program product are present for operating an aircraft. A roll angle limit is identified using a load factor selected to allow a lateral maneuvering capability of the aircraft by forming an identified roll angle limit in response to vertical maneuvering of the aircraft. The vertical maneuvering of the aircraft is performed using the identified roll angle limit.

21 Claims, 5 Drawing Sheets

DYNAMIC ROLL ANGLE STALL PROTECTION FOR AN AIRCRAFT

GOVERNMENT LICENSE RIGHTS

This invention was made with Government support under contract number N00019-04-C-3146 awarded by the United States Navy. The Government has certain rights in this invention.

BACKGROUND INFORMATION

1. Field

The present disclosure relates generally to the aircraft and in particular, to a method and apparatus for operating an aircraft. Still more particularly, the present disclosure relates to a method and apparatus for dynamic roll angle stall protection.

2. Background

During operation, an aircraft may fly in the air as a result of an aerodynamic force called lift. Lift is generated by the wings of an aircraft as air flows past the wings as a result of forward movement of the aircraft. The wings of an aircraft generate lift because of a pressure reduction on the upper side of the wings. The lower pressure on the upper side of the wing combined with a higher pressure on the underside of the wing provides the lift. Lift may be increased by increasing the angle between the wing chord and the relative airflow. This angle is also referred to as an angle of attack.

With the increase in the angle of attack, drag also may increase. Without sufficient engine power, the aircraft may slow, further decreasing the wing lift. When the angle of attack increases above a selected angle, the airflow becomes turbulent, and the lift may disappear causing the aircraft to "stall" because the wings cease to provide sufficient lift to support the aircraft. This angle is also referred to as a critical angle of attack.

This type of stall may occur in a number of different situations. For example, a stall may occur during a climb and/or a bank maneuver. A climb or descent maneuver typically is used to change the altitude of the aircraft. The change in altitude is also referred to as vertical maneuvering. The maximum lift capability of the aircraft may be exceeded when a steep bank occurs while descending and capturing altitude during low-speed maneuvers, which may result in stalling the aircraft. A stall also may occur if a climb is initiated from a situation in which the aircraft is in a steep bank while the speed is slow and the climb is initiated.

Therefore, it would be advantageous to have a method and apparatus to overcome the problems described above.

SUMMARY

In one advantageous embodiment, a method is present for operating an aircraft. A roll angle limit is identified using a load factor selected to allow a vertical maneuvering capability of the aircraft to form an identified roll angle limit in response to vertical maneuvering of the aircraft. The vertical maneuvering of the aircraft is performed using the identified roll angle limit.

In another advantageous embodiment, an apparatus comprises a process and a computer. The process is capable of identifying a roll angle limit using a load factor selected to allow a vertical maneuvering capability of the aircraft to form an identified roll angle limit in response to vertical maneuvering of the aircraft. The process is executed on the computer.

In yet another advantageous embodiment, a computer program product for operating an aircraft comprises a computer recordable storage medium and program code. The program code is stored on the computer recordable storage medium. Program code is present for identifying a roll angle limit using a load factor selected to allow a vertical maneuvering capability of the aircraft to form an identified roll angle limit in response to vertical maneuvering of the aircraft. Program code is also present for performing the vertical maneuvering of the aircraft using the identified roll angle limit.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
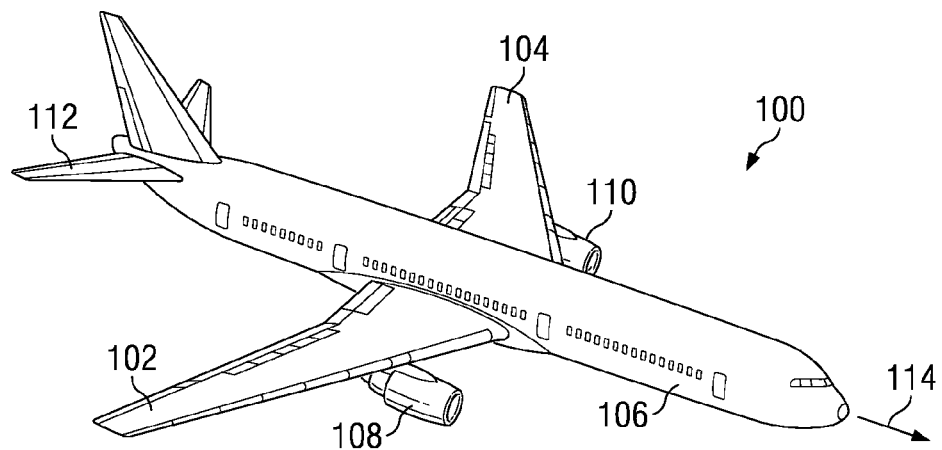
FIG. 1 is a diagram of an aircraft in accordance with an advantageous embodiment.

With reference now to the figures and in particular with reference to FIG. 1, a diagram of an aircraft is depicted in accordance with an advantageous embodiment may be implemented. Aircraft 100 is an example of an aircraft in which dynamic roll angle stall protection may be implemented. In particular, hardware and/or software may be implemented within aircraft 100 to identify a maximum safe roll angle for level flight with a reference load factor.

In this illustrative example, aircraft 100 has wings 102 and 104 attached to fuselage 106. Aircraft 100 also includes engine 108, engine 110, and tail 112. Aircraft 100 may make a number of different types of maneuvers. Some maneuvers may be lateral maneuvers in which aircraft 100 remains at the same altitude. Aircraft 100 also may perform vertical maneuvers in which the aircraft changes altitude.

In performing these maneuvers, aircraft 100 may change a roll angle. A roll angle represents the turning of an aircraft about longitudinal body axis 114. The amount of rotation around longitudinal body axis 114 is the roll angle. The roll angle also may be referred to as a bank angle or roll attitude. the different advantageous embodiments may be implemented many types of other types of aircraft, such as, for example, a commercial aircraft, a military aircraft, an unmanned aerial vehicle (UAV), or some other suitable type of aircraft.

Figure 2:
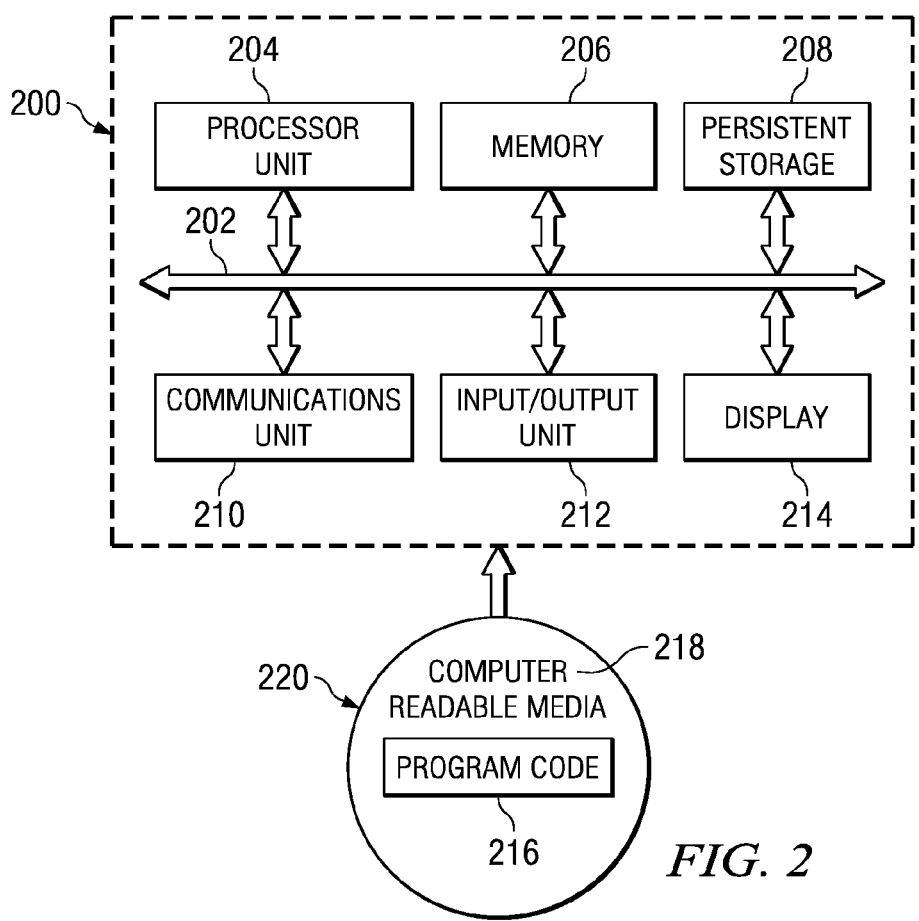
FIG. 2 a diagram of a data processing system in accordance with an illustrative embodiment.

Turning now to FIG. 2, a diagram of a data processing system is depicted in accordance with an illustrative embodiment. Data processing system 200 is an example of a data processing system that may be found in an aircraft such as, for example, aircraft 100 in FIG. 1. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208.

In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200.

Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different advantageous embodiments recognize that a minimum safe operational speed for aircraft is usually set at around one G-force. A G-force is a measurement of an object's acceleration expressed in G's. A G is a nominal acceleration of gravity on earth at sea level in these examples. The different advantageous embodiments recognize that the minimum safe operational speeds for aircraft are set up for around one G-force with a load factor allowance for banking to a specified maximum roll angle for lateral maneuvering to prevent stalling of the aircraft.

The different advantageous embodiments recognize that currently available systems for aircraft do not take into account vertical maneuvering. Lateral maneuvering is maneuvering on a horizontal plane while vertical maneuvering is up and down movement relative to a vertical plane. The different advantageous embodiments recognize that an additional load factor may be required to change the path of the aircraft while at the maximum specified roll angle to take into account vertical maneuvering by dynamically reducing the specific roll angle.

The different advantageous embodiments provide a method and apparatus for stall protection that controls a roll angle on a dynamic basis. In other words, the roll angle may be controlled while the aircraft is flying and is not set to some particular angle.

Figure 3:
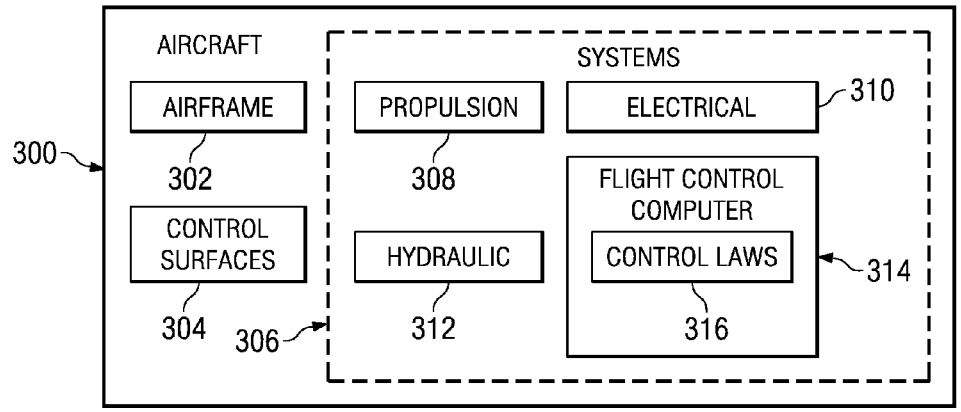
FIG. 3 is a block diagram of an aircraft in accordance with an advantageous embodiment.

With reference now to FIG. 3, a block diagram of an aircraft is depicted in accordance with an advantageous embodiment. Aircraft 300 illustrates components that may be found in an aircraft, such as, for example, aircraft 100 in FIG. 1. In this illustrative example, aircraft 300 has airframe 302 on which flight control surfaces 304 may be located. Further, systems 306 also may be integrated into or on airframe 302. These systems include, for example, propulsion system 308, electrical system 310, hydraulic system 312, and flight control computer 314.

Flight control computer 314 may control various components, such as, for example, propulsion system 308, electrical system 310, and hydraulic system 312 to control the operation of aircraft 300. Flight control computer 314 may perform these controls through the execution of software containing control laws 316. With control laws 316, flight control computer 314 is capable of controlling flight control surfaces 304 through commands sent to electrical system 310 and/or hydraulic system 312.

The different advantageous embodiments may be implemented within software, such as, for example, control laws 316 to allow the vertical maneuvering capability of the aircraft. Allowing the vertical maneuvering capability may include, for example, an increase in vertical maneuvering capability.

Figure 4:
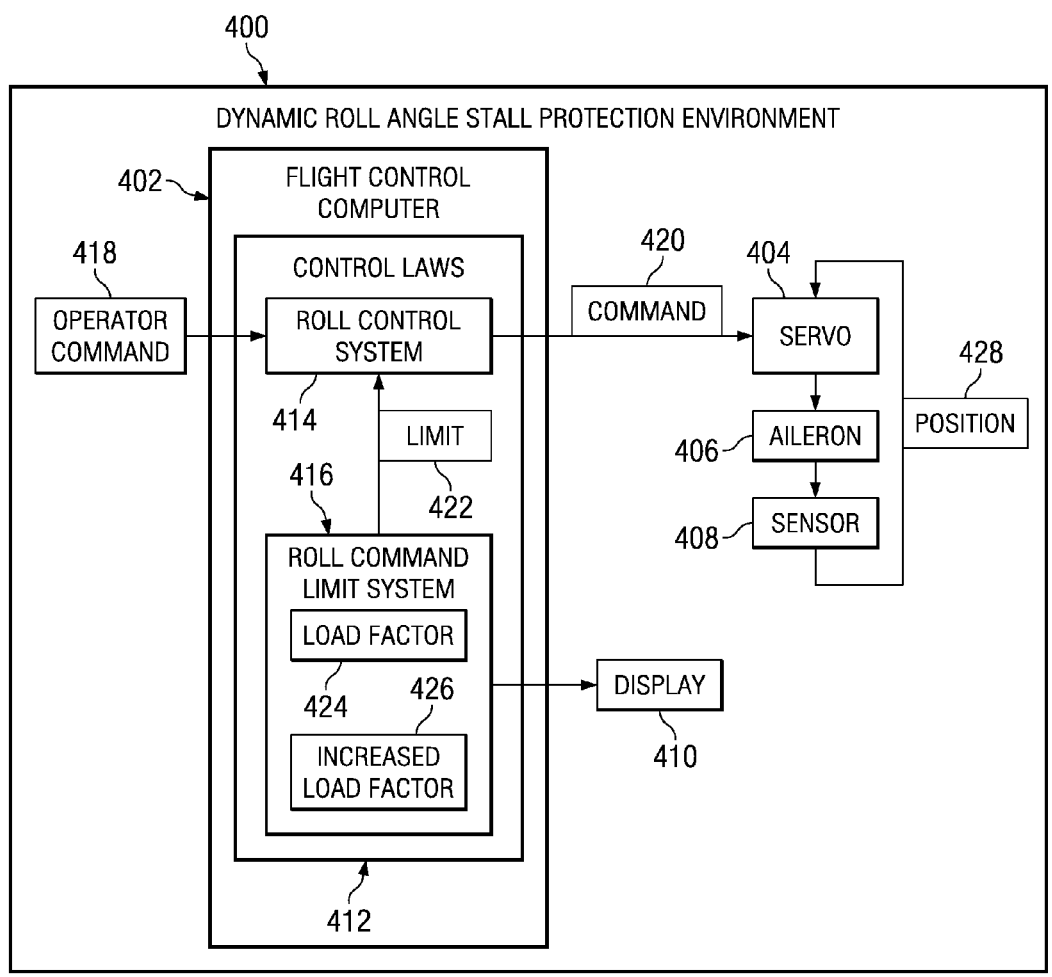
FIG. 4 is a diagram of a dynamic roll angle stall protection environment in accordance with an advantageous embodiment.

With reference now to FIG. 4, a diagram of a dynamic roll angle stall protection environment is depicted in accordance with an advantageous embodiment. Dynamic roll angle stall protection environment 400 is an example of an environment that may be implemented in aircraft 300 in FIG. 3. Dynamic roll angle stall protection environment 400 includes flight control computer 402, servo 404, aileron 406, sensor 408, and display 410.

Flight control computer 402 executes software, such as, for example, control laws 412. Control laws 412 control the operation of an aircraft in response to commands generated by an operator, state information about the aircraft, position of the aircraft, orientation of the aircraft, and/or other suitable information.

In this illustrative example, software in control laws 412 may include roll control system 414 and roll command limit system 416. Roll control system 414 controls the roll of an aircraft. In other words, roll control system 414 controls the roll angle of the aircraft. Roll command limit system 416 generates limits to the roll angle that may be commanded. The limit to the roll angle may be managed by limiting the movement and/or position of aileron 406.

Roll control system 414 receives operator input such as operator command 418. This operator command may be generated by a pilot manipulating a yoke, control column, joystick, side stick, or some other suitable control device. The operator also may be another computer device depending on the particular implementation.

Roll control system 414, in conjunction with roll command limit system 416 generates command 420 from operator command 418. Command 420 may be the same as operator command 418 or may be a modified or limited version of operator command 418. Command 420 is a command to change the position of aileron 408 to achieve a desired roll angle for the aircraft. In the different advantageous embodiments, roll command limit system 416 generates limit 422 to provide protection against stalling during lateral maneuvering at low speeds while the vertical path is changed. In this manner, the roll command limit allows the aircraft to avoid or reduce the number of situations in which a stall may occur. Limit 422 may vary dynamically depending on the type of maneuver being performed.

In the different advantageous embodiments, roll command limit system 416 generates limit 422 using load factor 424. Load factor 424 is a value that is calculated as the ratio of the lift on an aircraft to the weight of an aircraft. Load factor 424 may be expressed in multiples of G in which one G represents conditions in straight level flight. Typically, load factor 424 is dimensionless because it is a ratio of two forces. In the different advantageous embodiments, increased load factor 426 is used when the aircraft is performing vertical maneuvering.

In these examples, vertical maneuvering is maneuvering that changes the altitude upwards or downwards. Increased load factor 426 decreases the maximum safe roll angle that may be used in response to a roll command. This decreased maximum safe roll angle allows for increased vertical maneuverability. With vertical maneuvering, some lateral movement also occurs.

This type of reduction of the roll angle may reduce lateral maneuverability, which is not as great of a concern during vertical maneuvering. In this manner, increased load factor 426 leads to a decreased lateral maneuverability, while maintaining and/or increasing the vertical maneuverability to generate limit 422.

Thus, limit 422 may be dynamically varied depending on the type of maneuvering being performed. In other words, limit 422 may change as various conditions for the aircraft and/or the environment around the aircraft change. Roll control system 414 limits operator command 418 within limit 422 to generate command 420. Command 420 is sent to servo 404, which controls the position of aileron 406. Servo 404 changes the position of aileron 406. This change in position is detected by sensor 408. Sensor 408 generates position 428, which provides feedback to servo 404, which stops changing the position of aileron 406 when the appropriate position has been reached.

The illustration of dynamic roll angle stall protection environment 400 is not meant to imply physical or architectural limitations to the manner in which this type of environment may be implemented. In some advantageous embodiments, other components in addition to or in place of the ones illustrated may be employed. For example, in some advantageous embodiments, flight control computer 402 may control a number of ailerons or flight spoilers used for roll control in addition to aileron 406.

A number of items, as used herein, refers to one or more items. For example, a number of ailerons is one or more ailerons. In still other advantageous embodiments, additional load factors may be implemented for other types of maneuvering depending on the particular implementation. In still other implementations, roll control system 414 and roll command limit system 416 may be located on different physical computers rather than being both executed on flight control computer 402.

Figure 5A:
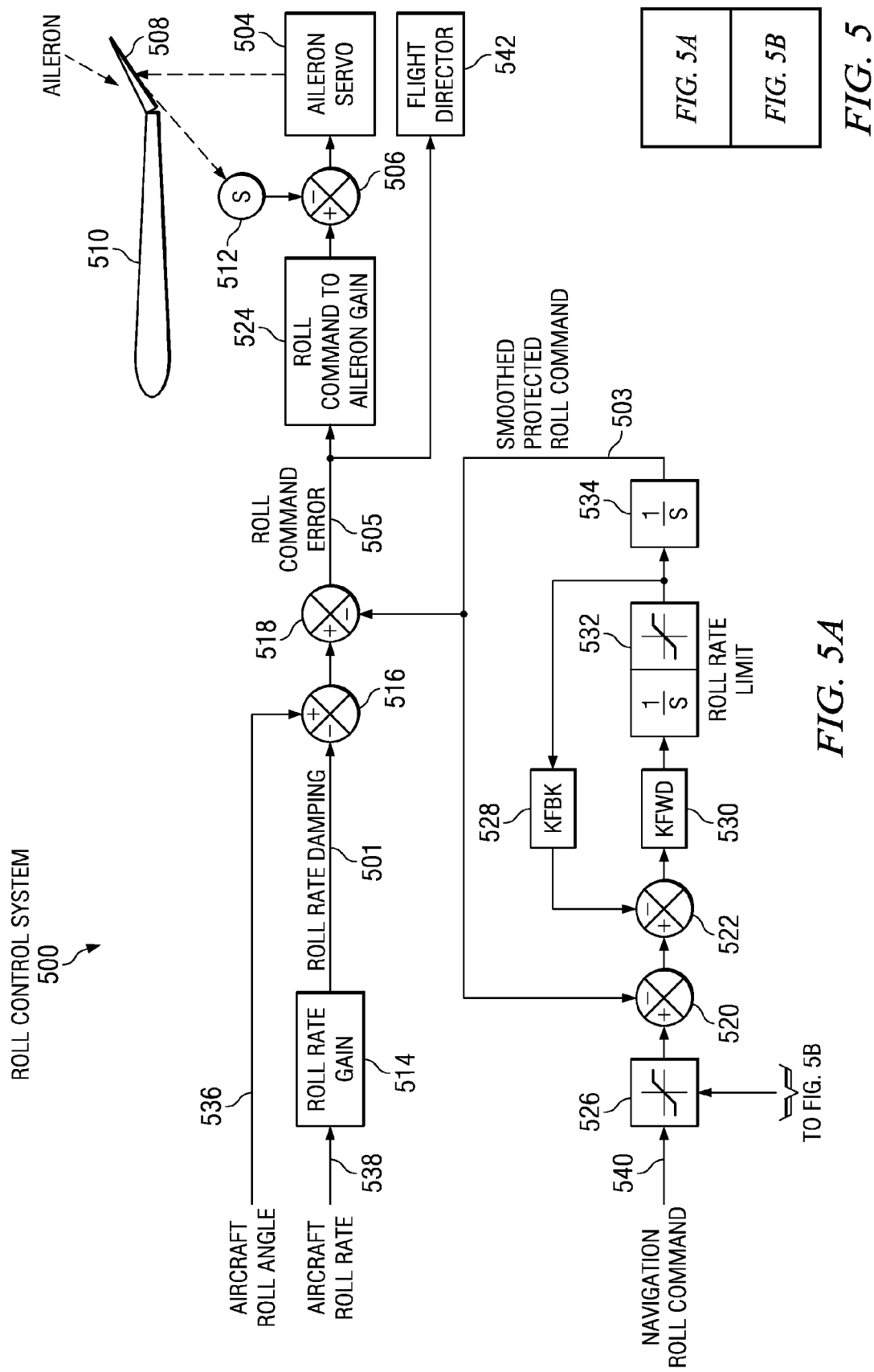
FIGS. 5A and 5B is a diagram of a roll control system and roll command limit system in accordance with an advantageous embodiment.
Figure 5B:
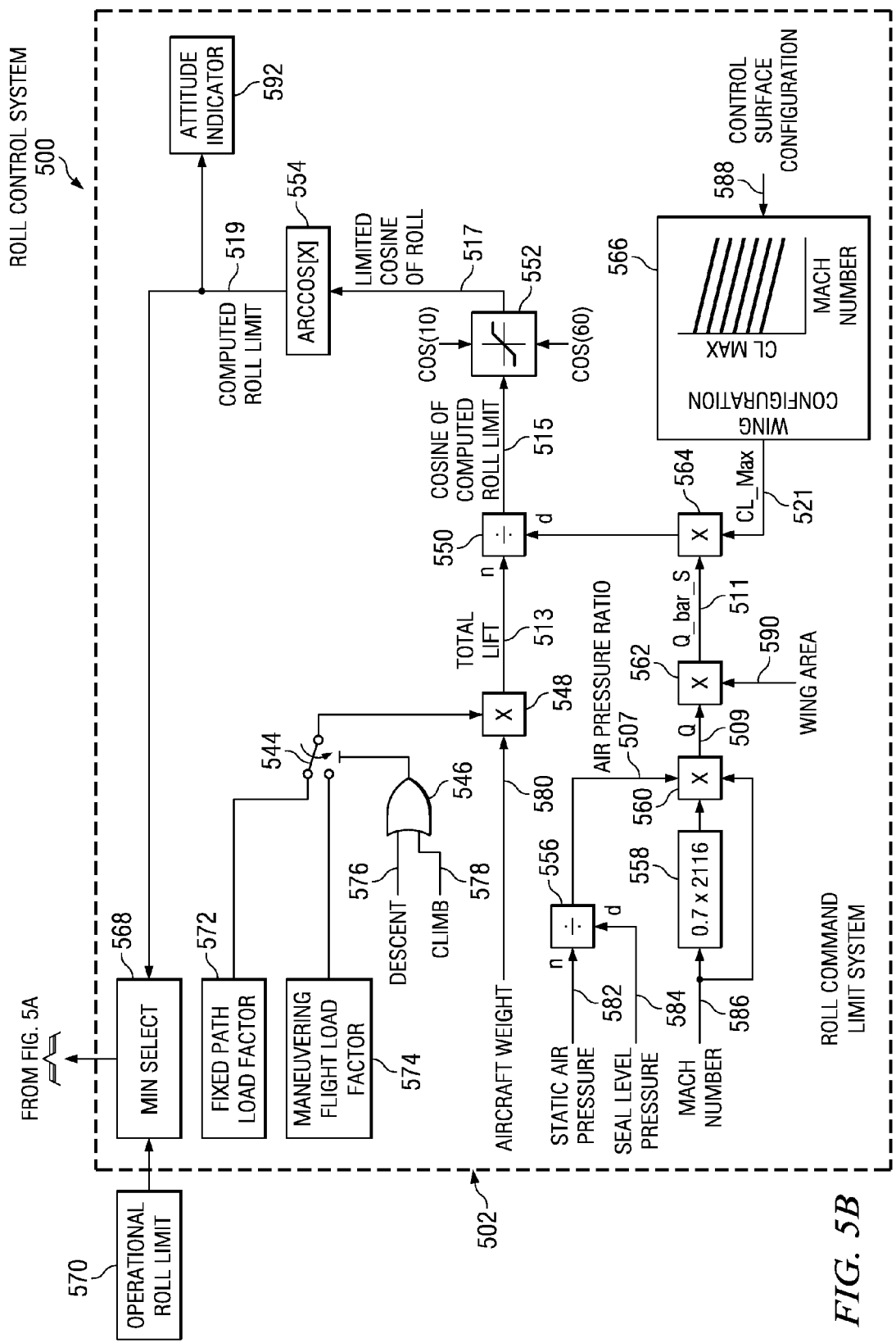

With reference now to FIGS. 5A and 5B, diagrams of a roll control system and roll command limit system is depicted in accordance with an advantageous embodiment. In this example, roll control system 500 and roll command limit system 502 is an example of one manner in which roll control system 414 and roll command limit system 416 in FIG. 4 may be implemented.

Roll control system 500 may send commands to aileron servo 504 through subtractor 506 to control the position of aileron 508 on wing 510. Sensor 512 may sense the position of aileron 508 and send this position information back to subtractor 506 as feedback to stop aileron servo 504 from moving aileron 508 when aileron 508 reaches the desired position.

In this example, roll control system 500 includes roll rate gain 514, subtractor 516, subtractor 518, subtractor 520, subtractor 522, roll command to aileron gain 524, roll altitude command limit 526, constant 528, constant 530, roll rate limit 532, and integrator 534. In this example, inputs into roll control system 500 are aircraft roll angle 536, aircraft roll rate 538, and navigation roll command 540.

Roll command limit system 502 includes switch 544, selector 546, multiplier 548, divider 550, limiter 552, arc-cosine function 554, divider 556, constant 558, multiplier 560, multiplier 562, multiplier 564, coefficient table 566, and selector 568. Inputs into roll command limit system 502 are operational roll limit 570, fixed path load factor 572, maneuvering flight load factor 574, descent 576, climb 578, aircraft weight 580, static air pressure 582, sea level pressure 584, mach number 586, control surface configuration 588, and wing area 590.

Aircraft roll rate 538 is multiplied by roll rate gain 514. The output of roll rate gain 514 is roll rate dampening 501. This value is subtracted from aircraft roll angle 536. Navigation roll command 540 is sent through roll angle command limit 526, which provides limits to navigation roll command 540.

In these examples, aircraft roll rate 538 is a damping value to prevent overshoot in the roll angle in aircraft roll angle 536.

The output of roll angle command limit 526 is sent into subtractor 520. The output of integrator 534 is subtracted from navigation roll command 540 as limited by roll angle command limit 526 at subtractor 520. The output of subtractor 520 is sent to subtractor 522, which subtracts the output of subtractor 520 from the output of roll rate limit 532 as modified by constant 528. The output of subtractor 522 is sent through constant 530. The output of constant 530 is then sent to roll rate limit 532, which in turn, has the output of roll rate limit 532 sent to integrator 534.

Navigation roll command 540 may be a command that provides a change in angle or direction of an aircraft. For example, navigation roll command 540 may change the direction of the aircraft from north to east, which requires a roll to change the direction of the aircraft. This roll may be at an angle of around 35 or 40 degrees to change the heading. Navigation roll command 540 may be generated by a pilot or some other device such as a flight management computer. The amount of change may be limited by roll attitude limit 526. This limit may control how fast the aircraft accelerates during the maneuver.

Subtractor 520, subtractor 522, constant 528, constant 530, roll rate limit 532, and integrator 534 form a loop to filter or smooth the command. In other words, if a command of 35 degrees is received from roll altitude command limit 526, the output of integrator 534 reaches 35 degrees over a period of time.

The output of integrator 534 is smoothed protected roll command 503. In these examples, smoothed protected roll command 503 is based on limits that are generated by roll command limit system 502. This roll command is considered protected because the roll command is limited to prevent a stall condition from occurring. Smoothed protected roll command 503 is smooth because the command changes over time in a manner that provides for a desired roll that may be gradual or slower than may occur if the command changes the aileron to the desired position immediately.

Smoothed protected roll command 503 is sent to subtractor 518 and is subtracted from the output of subtractor 516. The output of subtractor 518 is roll command error 505, which is sent to roll command to aileron gain 524. Roll command to aileron gain 524 generates the position change based on the angle in roll command error 505. This component may generate a scale factor such as, for example, around 1.5 degrees of aileron movement for each degree of roll command error 505. This output is then sent to subtractor 506. The output of subtractor 506 is sent to aileron servo 504 to control the position of aileron and flight spoilers, not shown, if used for roll control 508.

Aileron servo 504 changes the position of aileron 508. This position is detected by sensor 512. As the position becomes closer to the desired position, the error reduces. When the error becomes zero, aileron servo 504 stops changing the position of aileron 508 in these examples.

Additionally, the output of subtractor 518 also is sent to flight director 542. Flight director 542 is an example of a display device in an aircraft that may be used to present roll command error 505. The output of flight director 542 is a roll command in these examples.

In these examples, the limit generated by roll command limit system 502 is based off of a load factor selected from fixed path load factor 572 and maneuvering flight load factor 574. Fixed path load factor 572 is used during horizontal or lateral maneuvering while maneuvering flight load factor 574 is used during vertical maneuvering. Selection of these two load factors is performed using switch 544.

In other advantageous embodiments, maneuvering flight load factor 574 may be added to fixed path load factor 572 to generate the roll command limit. In this example, maneuvering flight load factor 574 may be a larger load factor than fixed path load factor 572.

Switch 544 is controlled by selector 546. Selector 546 causes the selection or use of maneuvering flight load factor 574 when descent 576 or climb 578 is present or detected. The output of switch 544 with the selected load factor is sent to multiplier 548.

The selected load factor is multiplied by aircraft weight 580 to generate total lift 513, which is sent to divider 550. Static air pressure 582 is divided by sea level pressure 584 by divider 556 with the output of divider 556 being sent to multiplier 560. The output of divider 556 is air pressure ratio 507. Mach number 586 is multiplied by constant 558. In this example, constant 558 may be selected to be around 0.7×

2116. This value represents a conversion factor for converting a Mach squared times air pressure ratio to pounds per square foot.

This result is sent to multiplier 560 along with mach number 586. The output of multiplier 560 is Q 509. In these examples, Q 509 represents dynamic pressure in pounds per square foot. Q is then multiplied by wing area 590 at multiplier 562 to generate Q_bar_S 511. In these examples, Q_bar_S 511 represents dynamic pressure times wing area in which S is the wing area.

Control surface configuration 588 is used to identify maximum coefficient of lift 521, CL_Max. Control surface configuration 588 may be identified from sensors identifying the locations of various control surfaces such as, for example, flaps, slats, spoilers, loading gear, landing gear doors, body speed brakes, deployable landing lights, and other suitable control surfaces or other moveable surfaces that may affect the wing or fuselage configuration in a manner that affects the coefficient of lift. Of course, any moveable surface or feature on the fuselage and/or wing may be taken into account. Further, engine thrust also may be taken into account in identifying maximum coefficient of lift 513. Coefficient table 566 may be implemented in a number of different ways.

For example, coefficient table 566 may be a plurality of graphs or tables in which each graph or table may be used to identify a maximum lift coefficient based on a particular configuration for the control surfaces.

The maximum coefficient of lift is multiplied by Q_bar_S 511. Total lift 513 is divided by the output of multiplier 564 to obtain cosine of computed roll limit 515. This value is sent into limiter 552, which limits the cosine of computed roll limit 515 to form limited cosine of roll 517, a value of around 10 degrees to around 60 degrees. Of course, the limit may vary depending on the particular implementation. Roll limit 515 may be selected based on a number of different factors. These factors include, for example, passenger comfort, maximum desirable roll for transport, maximum desirable roll for observations, and other suitable factors.

Arccosine function 554 generates computed roll limit 519 from limited cosine of roll 517. Computed roll limit 519 is limited between around 10 to around 60 degrees in these examples. Arccosine function 554 is used to obtain the actual roll angle. The computed roll limit is then sent to selector 568 which selects the smaller value between computed roll limit 519 and operational roll limit 570. This selected value is then sent to roll attitude command limit 526 for use in limiting the navigation roll command 540.

Additionally, computed roll limit 519 is also sent to attitude indicator 592. Attitude indicator 592 may be an instrument or indicator on a display in the flight deck.

In this manner, the different advantageous embodiments may generate a limit for the navigation roll command that is based on the particular type of maneuvering being performed by the aircraft. When the maneuvering is a lateral-type maneuver, fixed path load factor 572 is used to generate the computed roll limit. When a vertical maneuver is desired, maneuvering flight load factor 574 is used.

Maneuvering flight load factor 574 is higher than fixed path load factor 572 in these examples. This higher load factor allows for improved maneuverability during vertical flight maneuvering by reducing the angle at which aileron 508 may be extended.

In these examples, roll command limit system 502 may implement the following equation:

$$\text{Coefficient of Lift} = (\text{"Vertical Load Factor"} \times \text{"Weight"}) / (\cos(\text{"Roll Angle"}) \times \text{"Dynamic pressure"} \times \text{"wing area"}) \quad (1)$$

This equation may be revised to identify roll angle as follows:

$$\text{Roll Angle} = \arccos((\text{"Vertical Load Factor"} \times \text{"Weight"}) / (\text{"Coefficient of Lift"} \times \text{"Dynamic pressure"} \times \text{"wing area"})) \quad (2)$$

Equation (2) is used or implemented within roll command limit system 502 to compute a roll angle limit.

In both equations (1) and (2), Coefficient of Lift represents a maximum coefficient of lift. The dynamic pressure may be, for example, a computed dynamic pressure, a measured dynamic pressure, or some other suitable type of dynamic pressure, Q. The implementation of roll command limit system 502 is only one manner in which this limit may be computed. Of course, in other advantageous embodiments, other components may be used to identify the roll angle limit. With roll command limit system 502, the roll angle limit is zero when the air speed is at or around the stall speed and the load factor is around one.

The roll angle limit increases as the airspeed increases to identify the amount of roll that can occur before the aircraft reaches a stall angle of attack. The stall angle of attack may be identified using the stall coefficient of lift or maximum coefficient of lift 521, CL_Max. If the load factor increases or the weight increases, the roll angle decreases.

In the different advantageous embodiments, an increased load factor is used for maneuvering to reduce the roll angle limit such that the aircraft has slightly less lateral maneuvering capability, but increased vertical maneuvering capability. This type of reduction in the roll angle limit may be useful to allow for a change in a vertical path during lateral maneuvering.

In the different advantageous embodiments, roll command limit system 502 implements the following equation to identify the computed roll limit:

$$\text{Computed Roll Limit} = \arccos((\text{"Load Factor"} \times \text{"Weight"}) / (\text{"CL\_Max"} \times \text{"Q\_Bar\_S"})) \quad (3)$$

In these examples, aircraft weight 580 may be obtained from various sources. These sources include existing computations, pilot entry, flight management computers, calculation from aircraft sensors, or other suitable sources.

Figure 6:
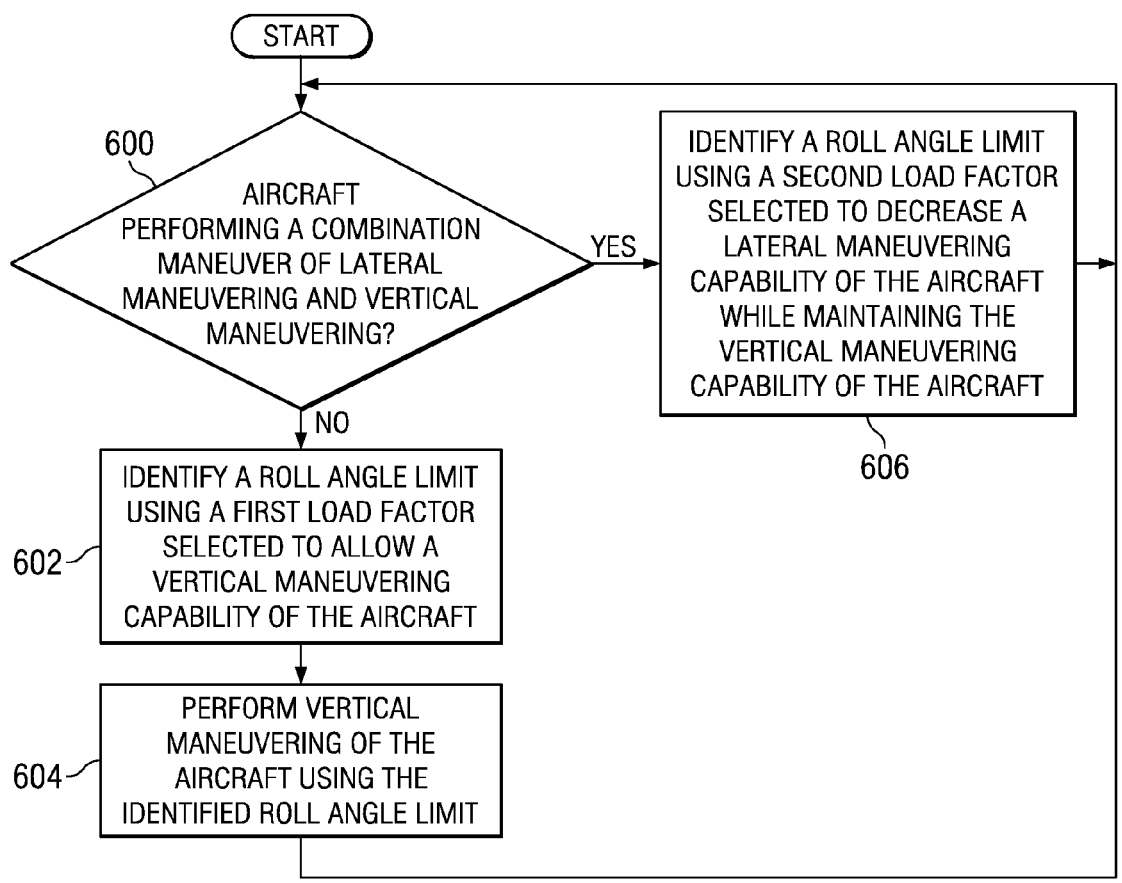
FIG. 6 is a flowchart of a process for operating an aircraft in accordance with an advantageous embodiment.

With reference now to FIG. 6, a flowchart of a process for operating an aircraft is depicted in accordance with an advantageous embodiment. The process illustrated in FIG. 6 may be implemented in an aircraft such as aircraft 100 in FIG. 1. In particular, the process may be implemented in control laws, such as control laws 412 in FIG. 4.

The process begins by determining whether the aircraft is performing a combination maneuver of lateral maneuvering and vertical maneuvering (operation 600). If the aircraft is not performing a combination maneuver, a roll angle limit is identified using a first load factor selected to allow a vertical maneuvering capability of the aircraft (operation 602). Vertical maneuvering of the aircraft is performed using the identified roll angle limit (operation 604). The process then returns to operation 600.

If a determination is made in operation 600 that the aircraft is performing a combination maneuver, a roll angle limit is identified using a second load factor selected to decrease a lateral maneuvering capability of the aircraft, while maintaining the vertical maneuvering capability of the aircraft (operation 606). The process then returns to operation 600.

The process illustrated in FIG. 6 is performed dynamically such that the roll angle limit changes while the aircraft performs maneuvers. For example, as factors, such as the lift of the aircraft change during flight, the roll angle limit may change.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of a flight control computer operating an aircraft, the method comprising:
    responsive to vertical maneuvering of the aircraft, identifying a roll angle limit using a load factor selected to allow a vertical maneuvering capability of the aircraft to form an identified roll angle limit; and
    performing the vertical maneuvering of the aircraft using the identified roll angle limit.

2. The method of claim 1, wherein the load factor is a first load factor and further comprising:
    responsive to lateral maneuvering, identifying the roll angle limit using a second load factor selected to decrease a lateral maneuvering capability of the aircraft, while maintaining the vertical maneuvering capability of the aircraft to form the identified roll angle limit.

3. The method of claim 1, wherein the performing step comprises:
    receiving a command to roll the aircraft; and
    using the identified roll angle limit as a limit to an angle specified by the command to form a limited command.

4. The method of claim 3, wherein the performing step further comprises:
    sending the limited command to a servo capable of controlling a position of a control surface for the aircraft.

5. The method of claim 4, wherein the control surface is an aileron or device to obtain an aircraft rolling moment.

6. The method of claim 1, wherein the roll angle limit is identified as follows:
    Roll Angle=arcos ((vertical load factor×weight)/(coefficient of lift×dynamic pressure×wing area)).

7. The method of claim 6 further comprising:
    identifying a maximum coefficient of lift from a current configuration of surfaces on the aircraft.

8. The method of claim 1, wherein the identifying step is performed dynamically during the vertical maneuvering of the aircraft.

9. The method of claim 1, wherein the identifying step is performed in a control law executing on the flight control computer.

10. The method of claim 6, wherein the coefficient of lift is a maximum coefficient of lift and is computed as a function of a surface configuration for the aircraft.

11. The method of claim 1 further comprising:
    displaying the identified roll angle limit on a display device in the aircraft.

12. The method of claim 1, wherein the identified roll angle limit prevents stalling of the aircraft during the vertical maneuvering.

13. An apparatus comprising:
    a process capable of identifying a roll angle limit using a load factor selected to increase a vertical maneuvering capability of an aircraft to form an identified roll angle limit in response to vertical maneuvering of the aircraft; and
    a computer, wherein the process executes on the computer.

14. The apparatus of claim 13 further comprising:
    a wing; and
    a control surface on the wing.

15. The apparatus of claim 13, wherein the load factor is a first load factor and wherein the process is capable of identifying the roll angle limit using a second load factor selected to decrease a lateral maneuvering capability of the aircraft, while maintaining the vertical maneuvering capability of the aircraft to form the identified roll angle limit, in response to vertical maneuvering.

16. The apparatus of claim 14, wherein the control surface is an aileron.

17. The apparatus of claim 13, wherein the roll angle is identified as follows:

Roll Angle=arcos ((vertical load factor×weight)/("coefficient of lift×dynamic pressure×wing area")).

18. A computer program product for operating an aircraft, the computer program product comprising:
  a computer recordable storage medium;
  program code, stored on the computer recordable storage medium, responsive to vertical maneuvering of the aircraft, for identifying a roll angle limit using a load factor selected to allow a vertical maneuvering capability of the aircraft to form an identified roll angle limit; and
  program code, stored on the computer recordable storage medium, for performing the vertical maneuvering of the aircraft using the identified roll angle limit.

19. The computer program product of claim 18, wherein the load factor is a first load factor and further comprising:
  program code, stored on the computer recordable storage medium, responsive to vertical maneuvering, for identifying the roll angle limit using a second load factor selected to decrease a lateral maneuvering capability of the aircraft, while maintaining the vertical maneuvering capability of the aircraft to form the identified roll angle limit.

20. The computer program product of claim 18, wherein the program code, stored on the computer recordable storage medium, for performing the vertical maneuvering of the aircraft using the identified roll angle limit comprises:
  program code, stored on the computer recordable storage medium, for receiving a command to roll the aircraft; and
  program code, stored on the computer recordable storage medium, for using the identified roll angle limit as a limit to an angle specified by the command to form a limited command.

21. The computer program product of claim 20, wherein the program code, stored on the computer recordable storage medium, for performing the vertical maneuvering of the aircraft using the identified roll angle limit further comprises:
  program code, stored on the computer recordable storage medium, for sending the limited command to a servo capable of controlling a position of a control surface for the aircraft.

* * * * *